US011781662B2

(12) United States Patent
Schäfer et al.

(10) Patent No.: US 11,781,662 B2
(45) Date of Patent: Oct. 10, 2023

(54) MULTI-PORT ROTARY ACTUATED VALVE ASSEMBLY

(71) Applicants: HANON SYSTEMS EFP DEUTSCHLAND GMBH, Bad Homburg v. d. Höhe (DE); Hanon Systems EFP Canada Ltd., Concord (CA)

(72) Inventors: Tilo Schäfer, Daubach (DE); Jan Hinrichs, Friedrichsdorf (DE); Michael Krug, Gau-Bischofsheim (DE); Dean Bajlon, Concord (CA); Frants Selimov, Zhitnitsa (BG)

(73) Assignees: HANON SYSTEMS EFP DEUTSCHLAND GMBH, Bad Homburg v. d. Höhe (DE); Hanon Systems EFP Canada Ltd., Concord (CA)

( * ) Notice: Subject to any disclaimer, the term of this patent is extended or adjusted under 35 U.S.C. 154(b) by 0 days.

(21) Appl. No.: 17/560,449

(22) Filed: Dec. 23, 2021

(65) Prior Publication Data
US 2022/0381354 A1 Dec. 1, 2022

Related U.S. Application Data

(60) Provisional application No. 63/194,400, filed on May 28, 2021.

(51) Int. Cl.
*F16K 11/085* (2006.01)
(52) U.S. Cl.
CPC ........ *F16K 11/0856* (2013.01); *F16K 11/085* (2013.01); *Y10T 137/86863* (2015.04)

(58) Field of Classification Search
CPC .. F16K 11/0856; F16K 11/085; F16K 11/076; F16K 11/0712; Y10T 137/86863
See application file for complete search history.

(56) References Cited

U.S. PATENT DOCUMENTS 3,258,920 A * 7/1966 Hott .......................... B66F 3/42
60/434
4,222,413 A 9/1980 Wulf
(Continued)

OTHER PUBLICATIONS

International Search Report and Written Opinion regarding International Patent Application No. PCT/IB2022/054976, dated Oct. 7, 2022.

*Primary Examiner* — Craig M Schneider
*Assistant Examiner* — Christopher D Ballman
(74) *Attorney, Agent, or Firm* — Harness, Dickey & Pierce, P.L.C.

(57) ABSTRACT

A multi-port, rotary actuated valve assembly for controlling fluid flow in a vehicle is provided, which includes a valve housing defining a puck-receiving cavity. A puck is positioned within the puck-receiving cavity and is rotatable therein. The puck has a plurality of chambers that interconnect different combinations of ports provided in the valve housing depending on the rotational position of the puck. The chambers in the puck include at least a first chamber and a second chamber, each of which include a chamber opening on the distal end of the puck. The opening to the first chamber on the distal end of the puck is radially inboard of the opening to the second chamber such that at least two separate and parallel fluid flow paths are provided on the distal end of the puck along which fluid may enter or exit the first and second chambers, respectively.

18 Claims, 8 Drawing Sheets

(56) References Cited

U.S. PATENT DOCUMENTS

| | | | | |
|---|---|---|---|---|
| 4,286,624 | A * | 9/1981 | Clausen | F16K 11/207 137/255 |
| 4,633,904 | A * | 1/1987 | Schumann | F16K 11/074 137/625.46 |
| 4,655,252 | A * | 4/1987 | Krumhansl | F16K 11/0853 251/59 |
| 4,711,392 | A * | 12/1987 | Kidouchi | F16K 11/20 137/625.33 |
| 4,915,132 | A * | 4/1990 | Hodge | F16K 11/0743 128/205.24 |
| 5,025,983 | A * | 6/1991 | Akita | G05D 23/1353 236/12.2 |
| 5,970,534 | A * | 10/1999 | Breda | E03C 1/023 137/625.46 |
| 6,197,195 | B1 * | 3/2001 | Booth | B01D 29/96 137/630.17 |
| 6,802,970 | B2 * | 10/2004 | Rochette | B01J 47/11 210/267 |
| 6,994,316 | B2 * | 2/2006 | Pervaiz | F16K 11/085 251/175 |
| 7,913,926 | B2 * | 3/2011 | Goncze | G05D 23/1346 236/12.11 |
| 8,631,823 | B2 * | 1/2014 | Heerklotz | F16K 31/5286 137/625.4 |
| 9,435,202 | B2 * | 9/2016 | Rafalski | F01B 1/08 |
| 9,500,299 | B2 | 11/2016 | Morein et al. | |
| 10,975,975 | B2 * | 4/2021 | Sato | F16K 11/076 |
| 11,598,441 | B2 * | 3/2023 | Karve | F16K 11/165 |
| 2006/0060245 | A1 | 3/2006 | Baumgarten et al. | |
| 2006/0118066 | A1 * | 6/2006 | Martins | F16K 11/0856 123/41.08 |
| 2006/0245956 | A1 * | 11/2006 | Lacroix | H02K 7/14 417/423.1 |
| 2012/0152385 | A1 * | 6/2012 | Ketola | F16K 25/005 137/625.46 |
| 2013/0105326 | A1 * | 5/2013 | Averbeck | C02F 1/008 251/129.01 |
| 2015/0184760 | A1 * | 7/2015 | Moeller | B29C 45/561 251/304 |
| 2019/0162320 | A1 * | 5/2019 | Hilgert | F16K 5/0407 |
| 2019/0368621 | A1 | 12/2019 | Marchand et al. | |
| 2021/0123374 | A1 | 4/2021 | Geißel et al. | |

* cited by examiner

MULTI-PORT ROTARY ACTUATED VALVE ASSEMBLY

CROSS-REFERENCE TO RELATED APPLICATIONS

This application claims the benefit of U.S. Provisional Application No. 63/194,400, filed on May 28, 2021. The entire disclosure of the application referenced above is incorporated herein by reference.

FIELD

The subject disclosure is generally directed to automotive valve assemblies, including without limitation, multi-port automotive coolant valves that are rotary actuated. The subject disclosure is also directed to methods of operating the same.

BACKGROUND

This section provides background information related to the present disclosure which is not necessarily prior art.

Automobiles typically include a variety of systems that require coolant or other fluids. For example, coolant has traditionally been used in radiator systems used to cool internal combustion engines. More recently, the proliferation of full-electric and hybrid-electric vehicles has expanded the usage of coolant systems for cooling electric motors, batteries, clutches, and other components of electric and hybrid-electric powertrains. As such, electric and hybrid-electric vehicles often include multiple coolant loops for delivering coolant to various components and sub-systems throughout the vehicle. This trend has created a need for increasingly complex coolant valves that can be actuated to control coolant flow to and from each of the multiple coolant loops in the vehicle. Notwithstanding the added complexity, these valves must remain durable, economical, and sized to fit within limited packaging constraints.

SUMMARY

This section provides a general summary of the disclosure and is not a comprehensive disclosure of its full scope or all of its features.

In accordance with one aspect of the present disclosure, a multi-port, rotary actuated valve assembly for controlling fluid flow in a vehicle is provided. The multi-port, rotary actuated valve assembly includes a valve housing that defines a puck-receiving cavity. The multi-port, rotary actuated valve assembly also includes a puck, positioned within the puck-receiving cavity, that is rotatable with respect to the valve housing about an axis of rotation between a plurality of rotational positions. A plurality of ports are defined within the valve housing and are arranged in fluid communication with the puck-receiving cavity. The puck includes a proximal end, a distal end opposite the proximal end, and a cylindrical face that is co-axially arranged with the axis of rotation. The puck also has a plurality of chambers that are separated and fluidly isolated from one another inside the puck. The plurality of chambers in the puck interconnect different combinations of the ports in the valve housing such that the different combinations of ports are placed in fluid communication with one another depending on the rotational position of the puck.

The plurality of chambers in the puck include at least a first chamber and a second chamber. The first chamber has a distal first chamber opening on the distal end of the puck. Similarly, the second chamber has a distal second chamber opening on the distal end of the puck. The distal second chamber opening is radially spaced from the axis of rotation of the puck and the distal first chamber opening is positioned radially inboard of the distal second chamber opening relative to the axis of rotation. In other words, the first and second chambers include separate chamber openings on the distal end of the puck, which are arranged on the distal end of the puck with the distal first chamber opening being radially inboard of (i.e., closer to the axis of rotation of the puck) than the distal second chamber opening. As a result, the distal first chamber opening and the distal second chamber opening provide at least two separate and parallel fluid flow paths at the distal end of the puck along which fluid may enter or exit the first and second chambers of the puck, respectively, which allows for additional fluid routing capacity and valve positions for a given puck size.

In accordance with another aspect of the present disclosure, the puck of the multi-port, rotary actuated valve assembly is designed such that the first chamber extends within the puck between a distal first chamber opening on the distal end of the puck and a proximal first chamber opening on the proximal end of the puck. Similarly, the puck is designed such that the second chamber extends within the puck between a distal second chamber opening on the distal end of the puck and a proximal second chamber opening on the proximal end of the puck. However, the second chamber of the puck also includes a circumferential second chamber opening on the cylindrical face of the puck. As a result of this arrangement, when the puck is rotated to a rotational position where the distal and proximal first chamber openings are arranged in fluid communication with corresponding ports in the valve housing, fluid may flow from the distal end of the puck, through the first chamber of the puck, to the proximal end of the puck or from the proximal end of the puck, through the first chamber of the puck, to the distal end of the puck. When the puck is rotated to a rotational position where the distal and proximal second chamber openings are arranged in fluid communication with corresponding ports in the valve housing, fluid may flow from the distal end of the puck, through the second chamber of the puck, to the proximal end of the puck or from the proximal end of the puck, through the second chamber of the puck, to the distal end of the puck. Finally, when the puck is rotated to a rotational position where the circumferential second chamber opening and at least one of the distal and proximal first chamber openings are arranged in fluid communication with corresponding ports in the valve housing, fluid may flow from the cylindrical face of the puck, through the second chamber of the puck, to the distal and/or proximal ends of the puck or from one or more of the distal and proximal ends of the puck, through the second chamber of the puck, to the cylindrical face of the puck. In accordance with this aspect of the present disclosure, the distal second chamber opening is radially spaced from the axis of rotation of the puck and the distal first chamber opening is positioned radially inboard of the distal second chamber opening relative to the axis of rotation. As a result, the distal first chamber opening and the distal second chamber opening provide at least two separate and parallel fluid flow paths at the distal end of the puck along which fluid may enter or exit the first and second chambers of the puck, respectively.

In accordance with another aspect of the present disclosure, the puck of the multi-port, rotary actuated valve assembly is designed such that the first chamber includes a distal first chamber opening on the distal end of the puck and a circumferential first chamber opening on the cylindrical face of the puck. Similarly, the puck is designed such that the second chamber includes a distal second chamber opening on the distal end of the puck and a circumferential second chamber opening on the cylindrical face of the puck. As a result of this arrangement, when the puck is rotated to a rotational position where the distal first chamber opening and the circumferential first chamber opening are arranged in fluid communication with corresponding ports in the valve housing, fluid may flow from the distal end of the puck, through the first chamber of the puck, to the cylindrical face of the puck or from the cylindrical face of the puck, through the first chamber of the puck, to the distal end of the puck. When the puck is rotated to a rotational position where the distal second chamber opening and the circumferential second chamber opening are arranged in fluid communication with corresponding ports in the valve housing, fluid may flow from the distal end of the puck, through the second chamber of the puck, to the cylindrical face of the puck or from the cylindrical face of the puck, through the second chamber of the puck, to the distal end of the puck. In accordance with this aspect of the present disclosure, the distal first chamber opening and the distal second chamber opening are concentrically arranged on the distal end of the puck relative to the axis of rotation such that the distal second chamber opening extends annularly about the distal first chamber opening. As a result, the distal first chamber opening and the distal second chamber opening provide at least two separate and parallel fluid flow paths at the distal end of the puck along which fluid may enter or exit the first and second chambers of the puck, respectively.

Advantageously, the multi-port, rotary actuated valve assembly arrangements described herein provide additional fluid routing capacity and valve positions for a given puck size, without requiring multiple valve bodies, multiple valve members, multiple actuators, or actuators with higher torque capacities. With respect to the later, the multi-port, rotary actuated valve assembly arrangements described herein are designed to operate with low friction such that small, inexpensive electric actuators and gearsets can provide sufficient driving torque to rotate the puck between the plurality of rotational positions.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, exemplary multi-port, rotary actuated valve assemblies 20, 20' are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The multi-port, rotary actuated valve assembly 20 illustrated in FIGS. 1-4 includes a valve housing 22 that defines a puck-receiving cavity 24. The multi-port, rotary actuated valve assembly 20 also includes a puck 26, positioned within the puck-receiving cavity 24, that is rotatable with respect to the valve housing 22 about an axis of rotation 28 between a plurality of rotational positions. For example, in the illustrated configuration, the puck 26 is designed to rotate between four different rotational positions that are 90 degrees apart, i.e., at 0 degrees (12 o'clock), 90 degrees (3 o'clock), 180 degrees (6 o'clock), and 270 degrees (9 o'clock). The multi-port, rotary actuated valve assembly 20 includes an electric actuator 30 that drives rotation of the puck 26 between the different rotational positions. More specifically, the multi-port, rotary actuated valve assembly 20 includes a shaft 32 that is fixedly coupled to the puck 26 and the electric actuator 30 is configured to drive rotation of the shaft 32 to change the rotational position of the puck 26 relative to the valve housing 22. The shaft 32 may be a separate component that is fastened, adhered, or welded to the puck 26 or alternatively may be integral with the puck 26. Regardless of the implementation, the shaft 32 and puck 26 rotate together relative to the valve housing 22.

The valve housing 22 is preferably made of plastic and is divided into two halves: a proximal housing clamshell 34 and a distal housing clamshell 36. In the orientation shown in FIG. 1, the proximal housing clamshell 34 is positioned above the distal housing clamshell 36; however, it should be appreciated that the multi-port, rotary actuated valve assembly 20 may be installed/mounted in a vehicle at a variety of different orientations and is therefore not limited to the orientation shown in the Figures. The proximal housing clamshell 34 and the distal housing clamshell 36 are joined together to form the puck-receiving cavity 24. Preferably, both the proximal housing clamshell 34 and the distal housing clamshell 36 are made of plastic and are joined together by spot, sonic, or heat welding. Like the valve housing 22, the puck 26 is also preferably made of plastic. The shaft 32, which may be made of plastic or metal, extends through, and is supported by the proximal housing clamshell 34, as is the electric actuator 30, which may be a DC or AC electric actuator, for example. Optionally, the proximal housing clamshell 34 may house a gearset 38 that rotatably couples the electric actuator 30 to the shaft 32 through a gear reduction.

The puck-receiving cavity 24 in the valve housing 22 includes a proximal region 40 defined by the proximal housing clamshell 34, a distal region 42 defined by the distal housing clamshell 36, and a cylindrical wall 44 defined by the proximal and/or distal housing clamshells 34, 36. A plurality of ports 46a-46e are defined within the valve housing 22 and are arranged in fluid communication with the puck-receiving cavity 24. For example, in the illustrated configuration shown in FIGS. 1-4, the multi-port, rotary actuated valve assembly 20 includes a total of 5 tubular ports: a first port 46a, a second port 46b, a third port 46c, a fourth port 46d, and a fifth port 46e. The first port 46a is positioned in the distal housing clamshell 36 at the 0 degree (12 o'clock) position and is arranged in fluid communication with the distal region 42 of the puck-receiving cavity 24. The second port 46b is positioned in the distal housing clamshell 36 at the 180 degree (6 o'clock) position and is also arranged in fluid communication with the distal region 42 of the puck-receiving cavity 24. The third port 46c is positioned in the distal housing clamshell 36 at the 90 degree (3 o'clock) position and extends through the cylindrical wall 44 of the puck-receiving cavity 24. The fourth port 46d is positioned in the proximal housing clamshell 34 at the 0 degree (12 o'clock) position and is arranged in fluid communication with the proximal region 40 of the puck-receiving cavity 24. Finally, the fifth port 46e is positioned in the proximal housing clamshell 34 at the 270 degree (9 o'clock) position and is also arranged in fluid communication with the proximal region 40 of the puck-receiving cavity 24.

The puck 26 includes a proximal end 48, a distal end 50 opposite the proximal end 48, and a cylindrical face 52 that is co-axially arranged with the axis of rotation 28. When the puck 26 is installed in the puck-receiving cavity 24 of the valve housing 22, the proximal end 48 of the puck 26 is positioned in the proximal region 40 of the puck-receiving cavity 24, the distal end 50 of the puck 26 is positioned in the distal region 42 of the puck-receiving cavity 24, and the cylindrical face 52 of the puck 26 is concentrically arranged and radially inward of the cylindrical wall 44 of the puck-receiving cavity 24. In addition, the shaft 32 is fixedly coupled to and extends axially from the proximal end 48 of the puck 26 along the axis of rotation 28.

Figure 1:
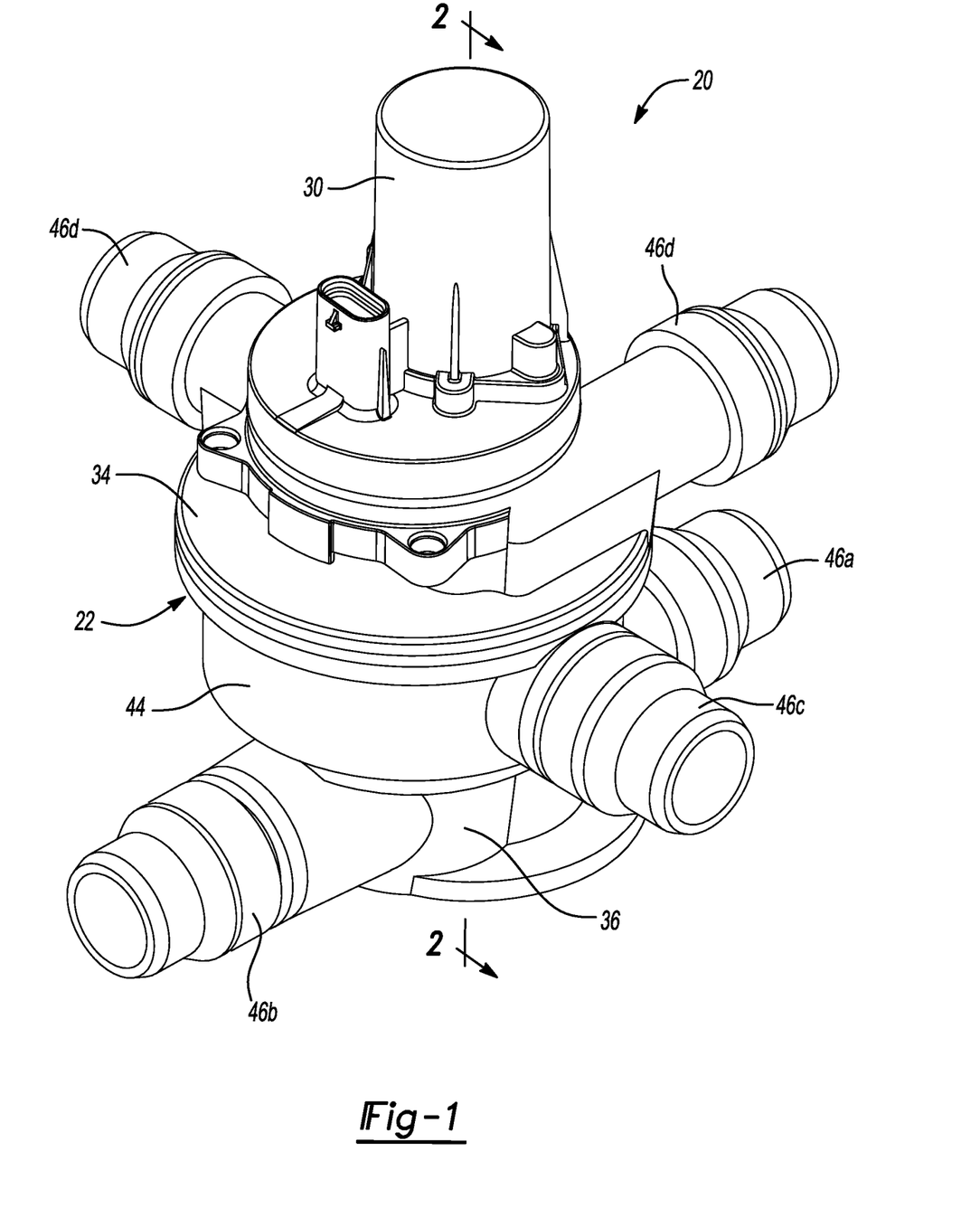
FIG. 1 is a top perspective view of an exemplary multi-port, rotary actuated valve assembly that has been constructed in accordance with the teachings of the present disclosure.
Figure 2:
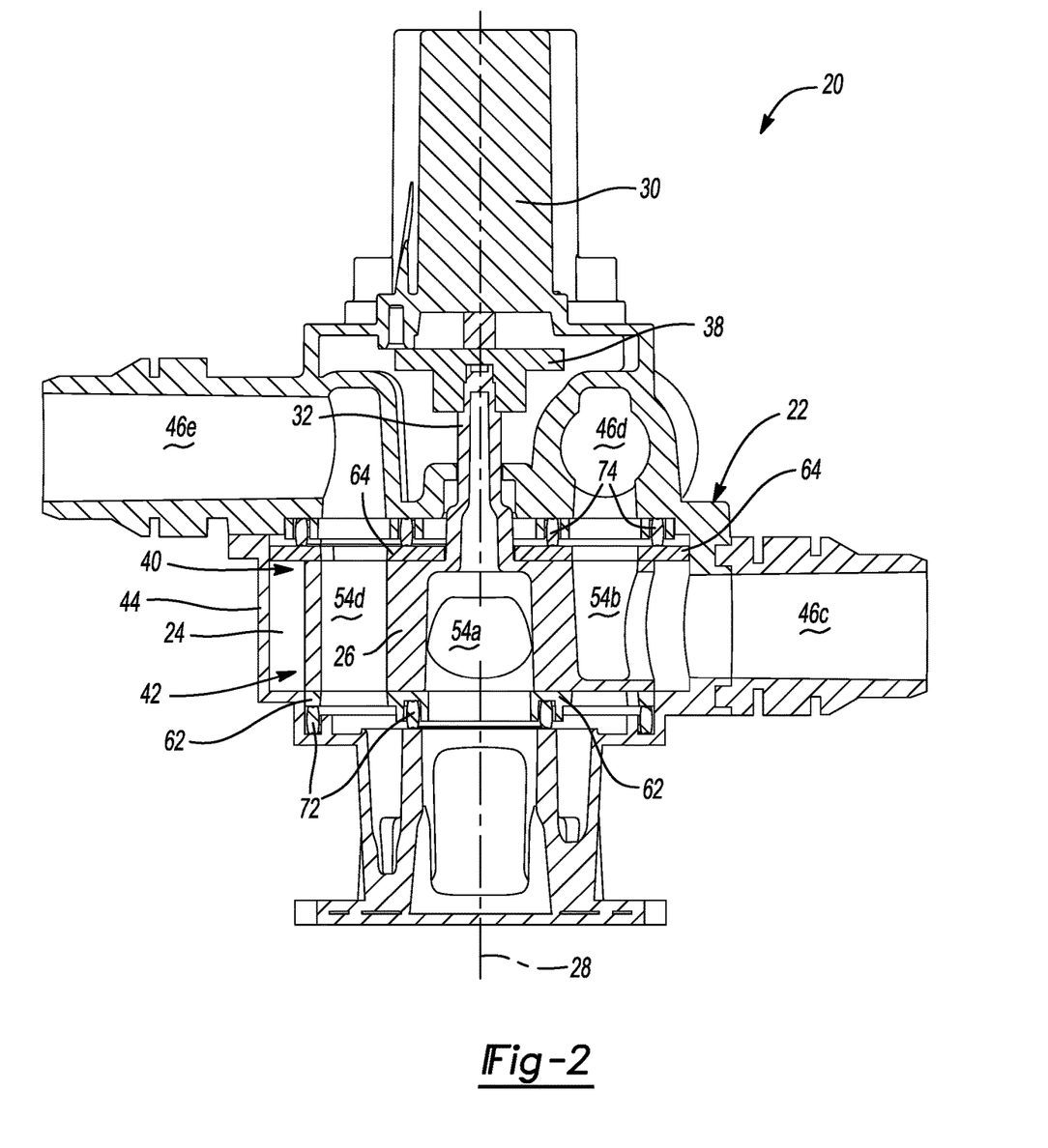
FIG. 2 is a side cross-section view of the exemplary multi-port, rotary actuated valve assembly illustrated in FIG. 1.
Figure 3A:
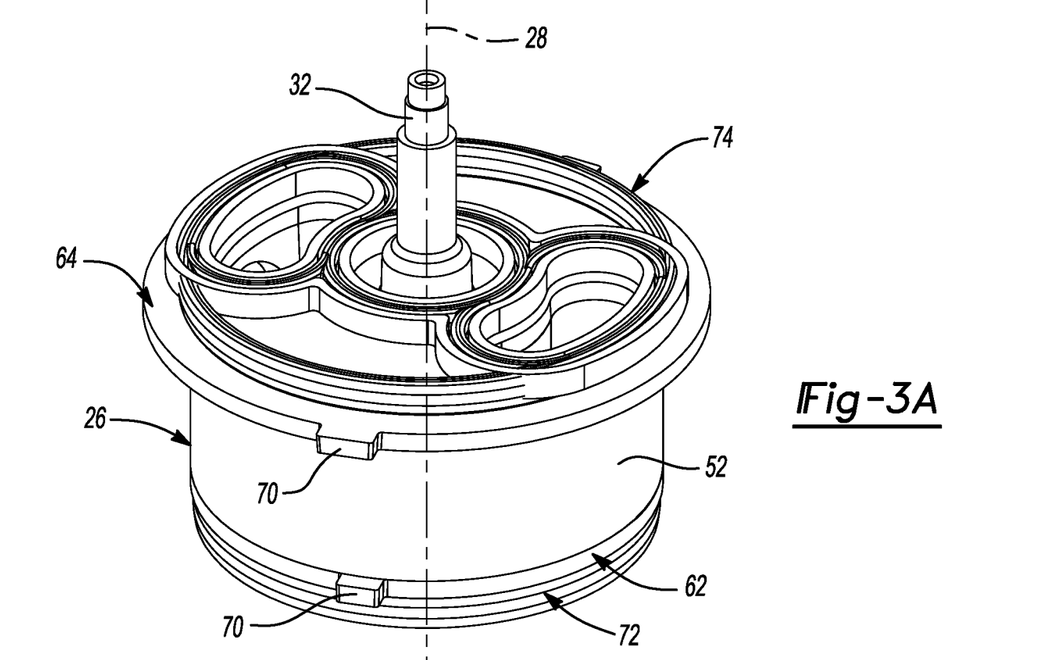
FIG. 3A is a top perspective view of the exemplary multi-port, rotary actuated valve assembly illustrated in FIG. 1 where the valve housing has been removed to show the puck, shaft, valve discs, and valve disc gaskets.
Figure 3B:
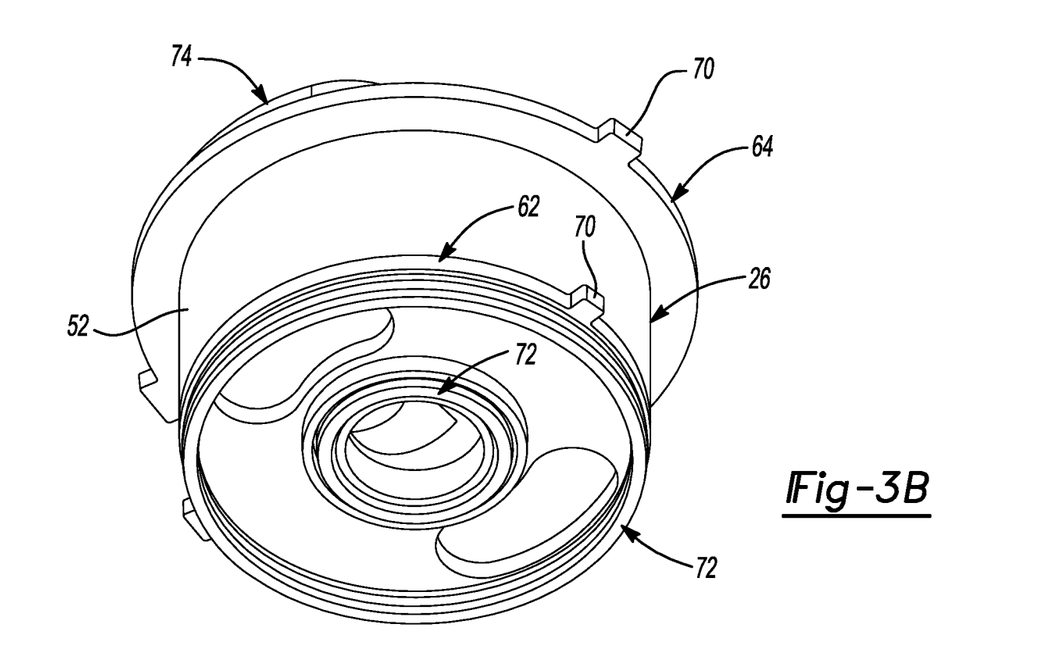
FIG. 3B is a bottom perspective view of the exemplary multi-port, rotary actuated valve assembly illustrated in FIG. 1 where the valve housing has been removed to show the puck, shaft, valve discs, and valve disc gaskets.
Figure 4:
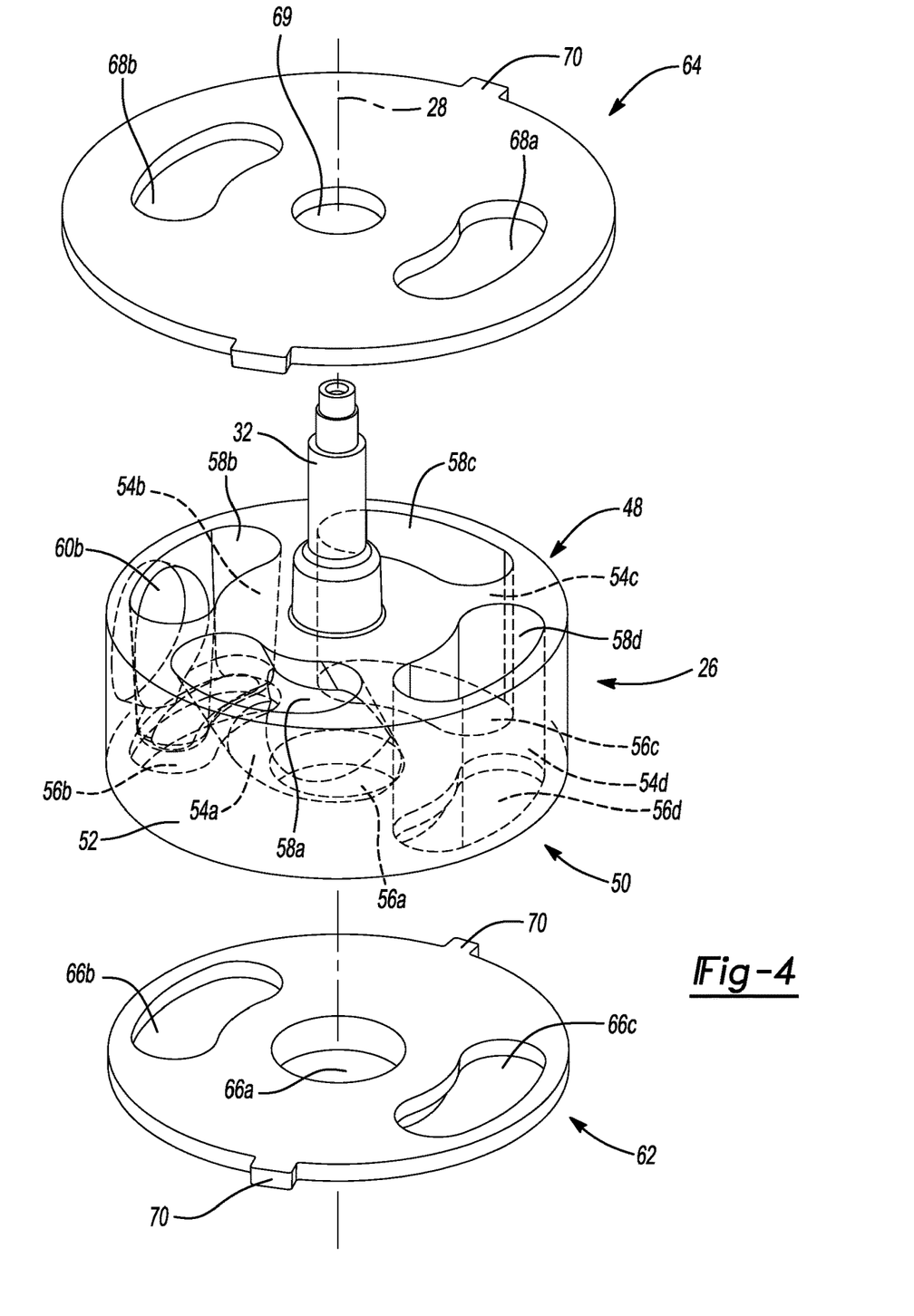
FIG. 4 is a top perspective view of the puck and shaft of the exemplary multi-port, rotary actuated valve assembly illustrated in FIGS. 3A and 3B, where the internal chambers in the puck are shown in dashed lines.
Figure 5:
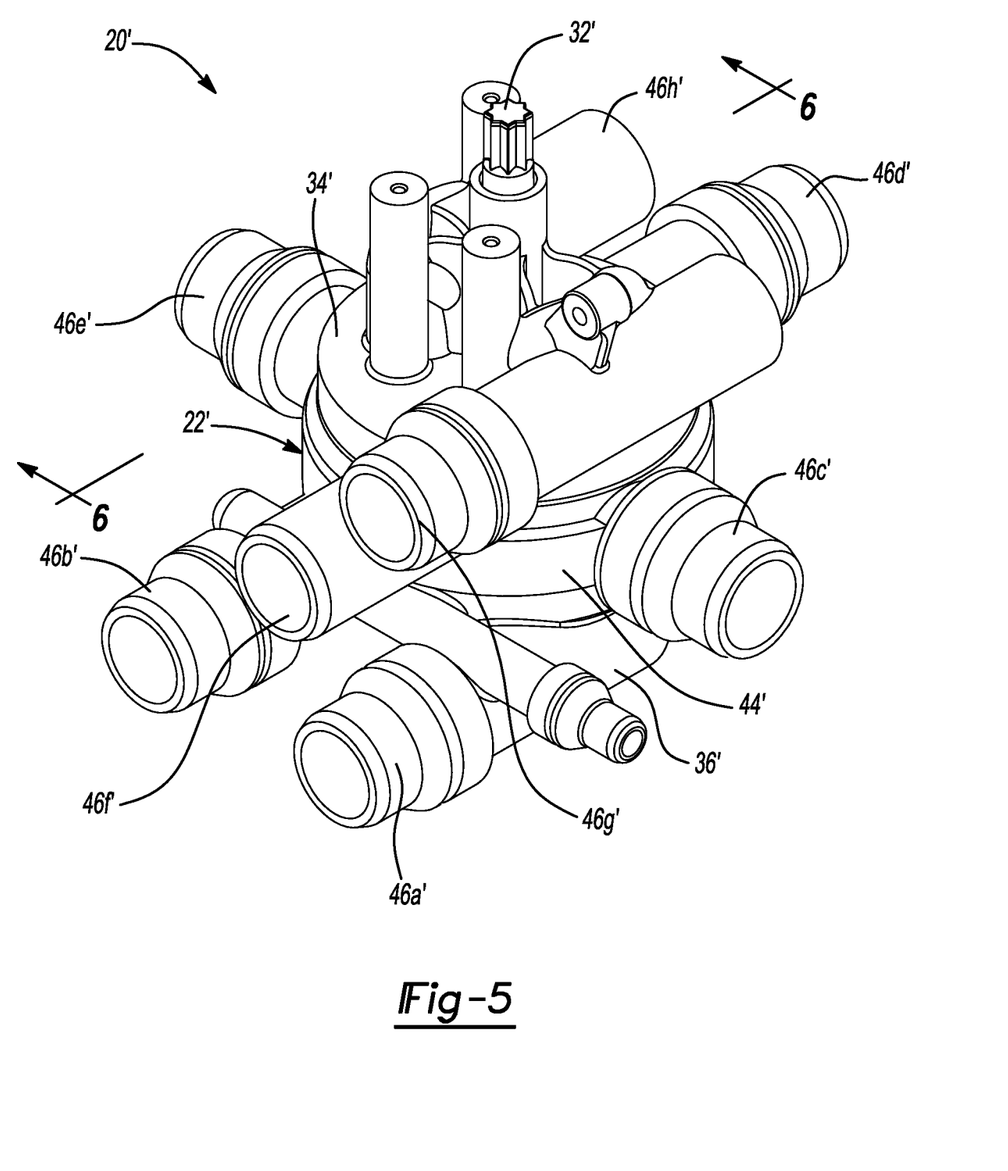
FIG. 5 is a top perspective view of another exemplary multi-port, rotary actuated valve assembly that has been constructed in accordance with the teachings of the present disclosure.

As best appreciated from FIG. 4, the puck 26 itself has a plurality of chambers 54a-54b that are separated and fluidly isolated from one another inside the puck 26. It should be appreciated that the plurality of chambers 54a-54b in the puck 26 interconnect different combinations of the ports 46a-46e in the valve housing 22 such that the different combinations of ports 46a-46e are placed in fluid communication with one another depending on the rotational position of the puck 26.

In the example shown in FIGS. 1-4, the puck 26 includes a total of 4 chambers: a first chamber 54a, a second chamber 54b, a third chamber 54c, and a fourth chamber 54d. The first chamber 54a extends through the puck 26 between a distal first chamber opening 56a on the distal end 50 of the puck 26 and a proximal first chamber opening 58a on the proximal end 48 of the puck 26. The second chamber 54b extends through the puck 26 between a distal second chamber opening 56b on the distal end 50 of the puck 26 and a proximal second chamber opening 58b on the proximal end 48 of the puck 26. The second chamber 54b of the puck 26 also includes a circumferential second chamber opening 60b on the cylindrical face 52 of the puck 26. The third chamber 54c extends through the puck 26 between a distal third chamber opening 56c on the distal end 50 of the puck 26 and a proximal third chamber opening 58c on the proximal end 48 of the puck 26. The fourth chamber 54d extends through the puck 26 between a distal fourth chamber opening 56d on the distal end 50 of the puck 26 and a proximal fourth chamber opening 58d on the proximal end 48 of the puck 26.

The distal second chamber opening 56b is positioned at 270 degrees (9 o'clock) on the distal end 50 of the puck 26, the distal third chamber opening 56c is positioned at 0 degrees (12 o'clock) on the distal end 50 of the puck 26, and the distal fourth chamber opening 56d is positioned at 90 degrees (3 o'clock) on the distal end 50 of the puck 26. As such, the distal second chamber opening 56b, distal third chamber opening 56c, and distal fourth chamber opening 56d are radially spaced from the axis of rotation 28 of the puck 26 at circumferentially spaced locations, while the distal first chamber opening 56a is positioned radially inboard of the distal second chamber opening 56b relative to the axis of rotation 28. In other words, the distal second chamber 56b opening, the distal third chamber opening 56c, and the distal fourth chamber opening 56d are all radially offset with respect to the axis of rotation 28 of the puck 26 and are positioned radially outboard of the distal first chamber opening 56a on the distal end 50 of the puck 26 relative to the axis of rotation 28. As a result, the distal first chamber opening 56a, the distal second chamber opening 56b, the distal third chamber opening 56c, and the distal fourth chamber opening 56d provide four separate and parallel fluid flow paths at the distal end 50 of the puck 26 along which fluid may enter or exit the first, second, third, and fourth chambers 54a-54d of the puck 26, respectively, which allows for additional fluid routing capacity and valve positions for a given puck size.

The proximal first chamber opening 58a is positioned at 180 degrees (6 o'clock) on the proximal end 48 of the puck 26, the proximal second chamber opening 58b is positioned at 270 degrees (9 o'clock) on the proximal end 48 of the puck 26, the proximal third chamber opening 58c is positioned at 0 degrees (12 o'clock) on the proximal end 48 of the puck 26, and the proximal fourth chamber opening 58d is positioned at 90 degrees (3 o'clock) on the proximal end 48 of the puck 26. As such, the proximal first chamber opening 58a, proximal second chamber opening 58b, proximal third chamber opening 58c, and proximal fourth chamber opening 58d are all radially spaced from the axis of rotation 28 of the puck 26 at circumferentially spaced locations. Thus, the first chamber 54a extends through the puck 26 at an oblique angle relative to the axis of rotation 28 while the second, third, and fourth chambers 54b, 54c, 54d extend in directions that are generally parallel to the axis of rotation 28. As a result, the proximal first chamber opening 58a, the proximal second chamber opening 58b, the proximal third chamber opening 58c, and the proximal fourth chamber opening 58d provide four separate and parallel fluid flow paths at the proximal end 48 of the puck 26 along which fluid may enter or exit the first, second, third, and fourth chambers 54a-54d of the puck 26, respectively, even though the fluid flow paths may not be parallel to one another after entering the chambers 54a-54d of the puck 26.

The multi-port, rotary actuated valve assembly 20 shown in FIGS. 1-4 includes a distal valve disc 62 that is positioned in the distal region 42 of the puck-receiving cavity 24 between the puck 26 and the distal housing clamshell 36 and a proximal valve disc 64 that is positioned in the proximal region 40 of the puck-receiving cavity 24 between the puck 26 and the proximal housing clamshell 34. The distal valve disc 62 is arranged in abutting contact with the distal end 50 of the puck 26 and includes a plurality of distal valve disc apertures, including: a first distal valve disc aperture 66a, a second distal valve disc aperture 66b, and a third distal valve disc aperture 66c. Each of the first, second, and third distal valve disc apertures 66a, 66b, 66c are placed in fluid communication with at least one of the distal first chamber opening 56a, the distal second chamber opening 56b, the distal third chamber opening 56c, and the distal fourth chamber opening 56d when the puck 26 is rotated to different rotational positions. Similarly, the proximal valve disc 64 is arranged in abutting contact with the proximal end 48 of the puck 26 and includes a plurality of proximal valve disc apertures, including: a first proximal valve disc aperture 68a and a second distal valve disc aperture 68b. Each of the first and second proximal valve disc apertures 66a, 66b are placed in fluid communication with at least one of the proximal first chamber opening 58a, the proximal second chamber opening 58b, the proximal third chamber opening 58c, and the proximal fourth chamber opening 58d when the puck 26 is rotated to different rotational positions. The proximal valve disc 64 also includes a shaft opening 69, through which the shaft 32 extends. Thus, the proximal valve disc 64 may also function to support the shaft 32. Each of the distal and proximal valve discs 62, 64 have one or more anti-rotation features 70 (e.g., tabs or ears along their outer circumference) that prevent the distal and proximal valve discs 62, 64 from rotating relative to the proximal and distal housing clamshells 34, 36 that form the valve housing 22.

The multi-port, rotary actuated valve assembly 20 also includes a distal valve disc gasket 72 that is positioned in the distal region 42 of the puck-receiving cavity 24 in abutting contact between the distal valve disc 62 and the distal housing clamshell 36 and a proximal valve disc gasket 74 that is positioned in the proximal region 40 of the puck-receiving cavity 24 in abutting contact between the proximal valve disc 64 and the proximal housing clamshell 34. Thus, the distal valve disc gasket 72 provides a fluid tight seal between the plurality of distal valve disc apertures 66a, 66b, 66c and the first and second ports 46a, 46b in the valve housing 22, while the proximal valve disc gasket 74 provides a fluid tight seal between the plurality of proximal valve disc apertures 68a, 68b and the fourth and fifth ports 46d, 46e in the valve housing 22.

The distal and proximal valve disc gaskets 72, 74 are each made of a resilient material and are axially taller than wide at one or more discrete cross-sections taken along one of the gaskets 72, 74. As a result of this particular construction, the distal and proximal valve disc gaskets 72, 74 bias the distal and proximal valve discs 62, 64 towards the proximal and distal ends 48, 50 of the puck 26 and permit a limited range of axial travel between the distal and proximal valve discs 62, 64 and the proximal and distal housing clamshells 34, 36 of the valve housing 22 in an axial direction that is parallel to the axis of rotation 28.

When the proximal and distal housing clamshells 34, 36 are joined together during assembly to form the valve housing 22 around the puck 26, the proximal and distal housing clamshells 34, 36 are pressed together until the distal and proximal valve disc gaskets 72, 74 are placed in a semi-compressed and pre-loaded condition at opposing ends of the puck 26. As such, the distal and proximal valve discs 62, 64 are permitted to float/move in an axial direction to some degree under the pre-load and cushioning provided by the distal and proximal valve disc gaskets 72, 74. Alternatively, the distal and proximal disc gaskets 72, 74 may be eliminated altogether in certain applications, such as in applications where working pressures are low, for example. When the distal and proximal disc gaskets 72, 74 are eliminated, the proximal and distal ends 48, 50 of the puck 26 and the proximal and distal housing clamshells 34, 36 may be formed with a series of grooves and rings that mate with each other in an interleaving arrangement to provide a labyrinth leakage path for fluid between respective chamber openings 56a-56d and 58a-58d on the proximal and distal ends 48, 50 of the puck 26 and the ports 46a-46e in the proximal and distal housing clamshells 34, 36 while still permitting rotation of the puck 26 within the puck-received cavity 24 of the valve housing 22.

When the puck 26 is rotated to a rotational position where the distal and proximal first chamber openings 56a, 58a are arranged in fluid communication with corresponding ports 46a, 46b, 46d, and/or 46e in the valve housing 22 during operation of the multi-port, rotary actuated valve assembly 20, fluid may flow from the distal end 50 of the puck 26, through the first chamber 54a of the puck 26, to the proximal end 48 of the puck 26 or from the proximal end 48 of the puck 26, through the first chamber 54a of the puck 26, to the distal end 50 of the puck 26. When the puck 26 is rotated to a rotational position where the distal and proximal second chamber openings 56b, 58b are arranged in fluid communication with corresponding ports 46a, 46b, 46d, and/or 46e in the valve housing 22, fluid may flow from the distal end 50 of the puck 26, through the second chamber 54b of the puck 26, to the proximal end 48 of the puck 26 or from the proximal end 48 of the puck 26, through the second chamber 54b of the puck 26, to the distal end 50 of the puck 26. When the puck 26 is rotated to a rotational position where the circumferential second chamber opening 60b and at least one of the distal and proximal first chamber openings 56a, 58a are arranged in fluid communication with corresponding ports 46a, 46b, 46d, and/or 46e in the valve housing 22, fluid may flow from port 46c, through the circumferential second chamber opening 60b in the cylindrical face 52 of the puck 26, through the second chamber 54b of the puck 26, to the proximal and/or distal ends 48, 50 of the puck 26 or from one or more of the proximal and distal ends 48, 50 of the puck 26, through the second chamber 54b of the puck 26, to the cylindrical face 52 of the puck 26. When the puck 26 is rotated to a rotational position where the distal and proximal third chamber openings 56c, 58c are arranged in fluid communication with corresponding ports 46a, 46b, 46d, and/or 46e in the valve housing 22, fluid may flow from the distal end 50 of the puck 26, through the third chamber 54c of the puck 26, to the proximal end 48 of the puck 26 or from the proximal end 48 of the puck 26, through the third chamber 54c of the puck 26, to the distal end 50 of the puck 26. Finally, when the puck 26 is rotated to a rotational position where the distal and proximal fourth chamber openings 56d, 58d are arranged in fluid communication with corresponding ports 46a, 46b, 46d, and/or 46e in the valve housing 22, fluid may flow from the distal end 50 of the puck 26, through the fourth chamber 54d of the puck 26, to the proximal end 48 of the puck 26 or from the proximal end 48 of the puck 26, through the fourth chamber 54d of the puck 26, to the distal end 50 of the puck 26.

FIGS. 5-9 illustrate another multi-port, rotary actuated valve assembly 20', which includes a valve housing 22' that has a plurality of ports 46c'-46f' arranged at circumferentially spaced locations along the cylindrical wall 44' of the puck-receiving cavity 24'. Many of the elements of the multi-port, rotary actuated valve assembly 20' shown in FIGS. 5-9 are the same as the elements of the multi-port, rotary actuated valve assembly 20 shown in FIGS. 1-4 and therefore share the same reference numbers, except that a prime (') annotation has been appended after the reference numbers in FIGS. 5-9.

The plurality of ports 46a'-46h' in the valve housing 22' of the multi-port, rotary actuated valve assembly 20' illustrated in FIGS. 5-9 includes a total of 8 ports that are arranged in fluid communication with the puck-receiving cavity 24': a first port 46a', a second port 46b', a third port 46c', a fourth port 46d', a fifth port 46e', a sixth port 46f', a seventh port 46g', and an eighth port 46h'. Like in FIGS. 1-4, the valve housing 22' illustrated in FIGS. 5-9 is divided into a proximal housing clamshell 34' and a distal housing clamshell 36'. Again, the puck-receiving cavity 24' in the valve housing 22' includes a proximal region 40' defined by the proximal housing clamshell 34', a distal region 42' defined by the distal housing clamshell 36', and a cylindrical wall 44' defined by the proximal and/or distal housing clamshells 34', 36'. The first and second ports 46a', 46b' are positioned in the distal housing clamshell 36' and are arranged in fluid communication with the distal region 42' of the puck-receiving cavity 24'. In particular, the first port 46a is arranged in fluid communication with an inboard distal cavity 76' that is defined with the distal housing clamshell 36' and that is open to the distal region 42' of the puck-receiving cavity 24'. The second port 46b' is arranged in fluid communication with an outboard distal cavity 78' that is also defined within the distal housing clamshell 36' and that also is open to the distal region 42' of the puck-receiving cavity 24'. The outboard distal cavity 78' in the distal housing clamshell 36' is separated from and extends annularly about the inboard distal cavity 76'. The third port 46c' is positioned along and extends through the cylindrical wall 44' of the puck-receiving cavity 24' at the 90 degree (3 o'clock) position. The fourth port 46d' is positioned along and extends through the cylindrical wall 44' of the puck-receiving cavity 24' at the 0 degree (12 o'clock) position. The fifth port 46e' is positioned along and extends through the cylindrical wall 44' of the puck-receiving cavity 24' at the 270 degree (9 o'clock) position. The sixth port 46f' is positioned along and extends through the cylindrical wall 44' of the puck-receiving cavity 24' at the 180 degree (6 o'clock) position. The seventh and eighth ports 46g', 46h' are positioned in the proximal housing clamshell 34' and are arranged in fluid communication with the proximal region 40' of the puck-receiving cavity 24'. In particular, the seventh port 46g' is arranged in fluid communication with an inboard proximal cavity 80' that is defined with the proximal housing clamshell 34' and that is open to the proximal region 40' of the puck-receiving cavity 24'. The eighth port 46h' is arranged in fluid communication with an outboard proximal cavity 82' that is also defined within the proximal housing clamshell 34' and that also is open to the proximal region 40' of the puck-receiving cavity 24'. The outboard proximal cavity 82' in the proximal housing clamshell 34' is separated from and extends annularly about the inboard proximal cavity 80'.

Like before, the puck 26' includes a proximal end 48', a distal end 50', and a cylindrical face 52' and the puck 26' is rotatable within the puck-receiving cavity 24' about an axis of rotation 28'. For example, in the illustrated configuration, the puck 26' is designed to rotate between four different rotational positions that are 90 degrees apart, i.e., at 0 degrees (12 o'clock), 90 degrees (3 o'clock), 180 degrees (6 o'clock), and 270 degrees (9 o'clock). The puck 26' itself has a plurality of chambers 54a'-54d' that are separated and fluidly isolated from one another inside the puck 26'. It should be appreciated that the plurality of chambers 54a'-54d' in the puck 26' interconnect different combinations of the ports 46a'-46h' in the valve housing 22' such that the different combinations of ports 46a'-46h' are placed in fluid communication with one another depending on the rotational position of the puck 26'. In the example shown in FIGS. 5-9, the puck 26' includes a total of 4 chambers: a first chamber 54a', a second chamber 54b', a third chamber 54c', and a fourth chamber 54d'. The first chamber 54a' extends through the puck 26' between a distal first chamber 54a' opening on the distal end 50' of the puck 26' and one or more circumferential first chamber openings 60a' on the cylindrical face 52' of the puck 26'. The second chamber 54b extends through the puck 26' between a distal second chamber opening 56b' on the distal end 50' of the puck 26' and one or more circumferential second chamber openings 60b' on the cylindrical face 52' of the puck 26'. The third chamber 54c' extends through the puck 26' between a proximal third chamber opening 58c' on the proximal end 48' of the puck 26' and one or more circumferential third chamber openings 60c on the cylindrical face 52' of the puck 26'. The fourth chamber 54d' extends through the puck 26' between a proximal fourth chamber opening 58d' on the proximal end 48' of the puck 26' and one or more circumferential fourth chamber openings 60d' on the cylindrical face 52' of the puck 26'.

In accordance with the design shown in FIGS. 5-9, the distal first chamber opening 56a' and the distal second chamber opening 56b' are concentrically arranged on the distal end 50' of the puck 26' relative to the axis of rotation 28 with the distal second chamber opening 56b' extending annularly about the distal first chamber opening 56a'. Similarly, the proximal third chamber opening 58c' and the proximal fourth chamber opening 58d' are concentrically arranged on the proximal end 48' of the puck 26' relative to the axis of rotation 28' with the proximal fourth chamber opening 58d' extending annularly about the proximal third chamber opening 58c'. As such, the distal second chamber opening 56b' and the proximal fourth chamber opening 58d' are radially spaced from the axis of rotation 28' of the puck 26', while the distal first chamber opening 56a' and the proximal third chamber opening 58c' are positioned radially inboard of the distal second chamber opening 56b' and the proximal fourth chamber opening 58d', respectively. As a result, the distal first chamber opening 56a' and the distal second chamber opening 56b' provide two separate and parallel fluid flow paths at the distal end 50' of the puck 26' along which fluid may enter or exit the first and second chambers 54a', 54b' of the puck 26', while the proximal third chamber opening 58c' and the proximal fourth chamber opening 58d' provide another two separate and parallel fluid flow paths at the proximal end 48' of the puck 26' along which fluid may enter or exit the third and fourth chambers 54c', 54d' of the puck 26', which allows for additional fluid routing capacity and valve positions for a given puck size.

Figure 6:
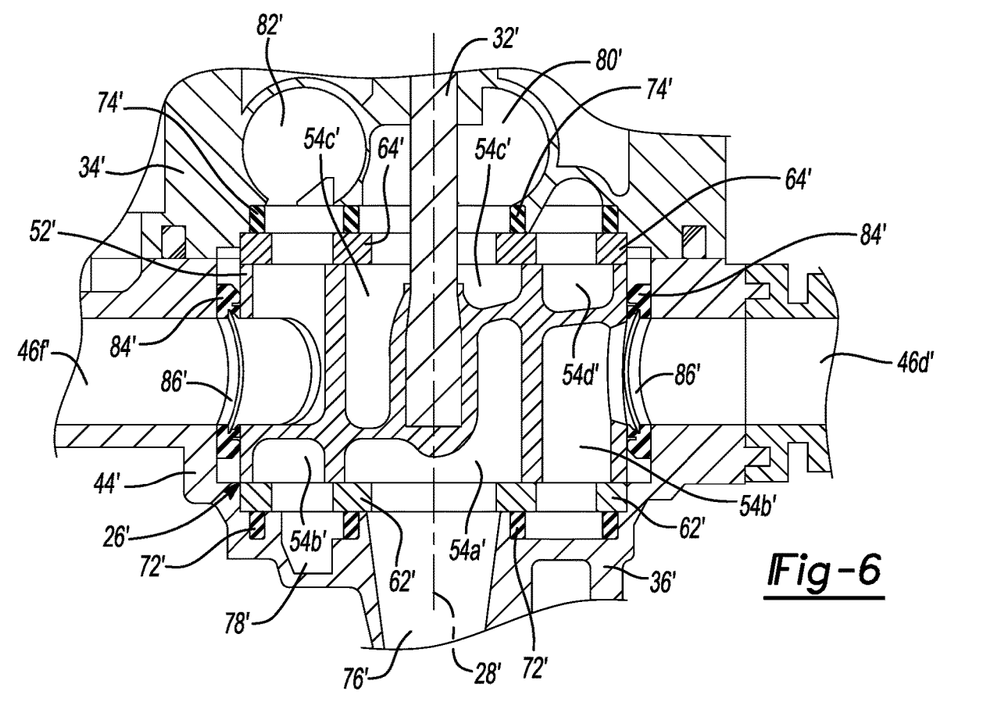
FIG. 6 is a side cross-section view of the exemplary multi-port, rotary actuated valve assembly illustrated in FIG. 5.
Figure 7A:
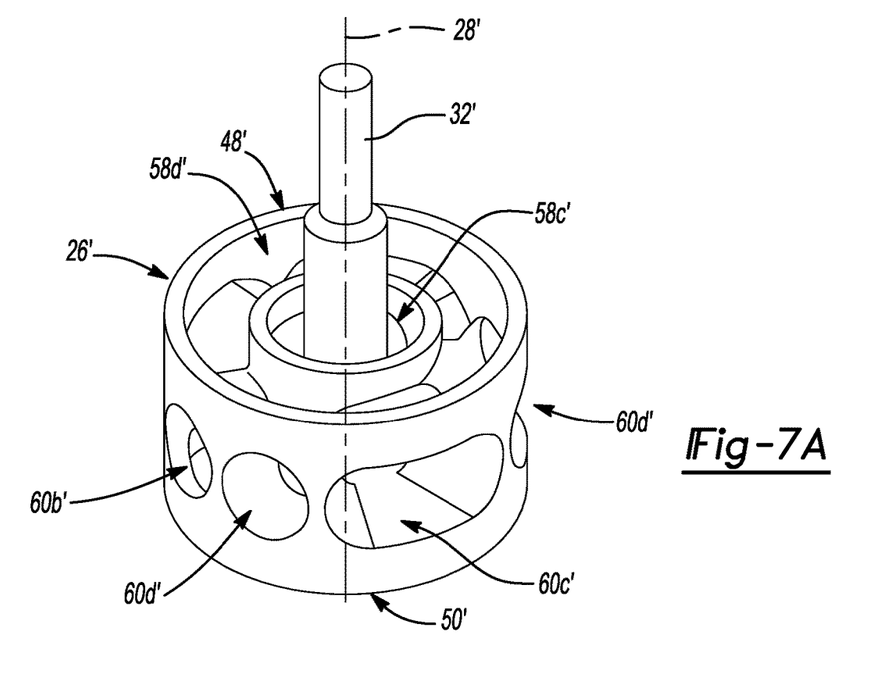
FIG. 7A is a top perspective view of the exemplary multi-port, rotary actuated valve assembly illustrated in FIG. 5 where the valve housing, valve discs, valve disc gaskets, and sealing elements have been removed to show the puck and shaft.
Figures 7B, 8:
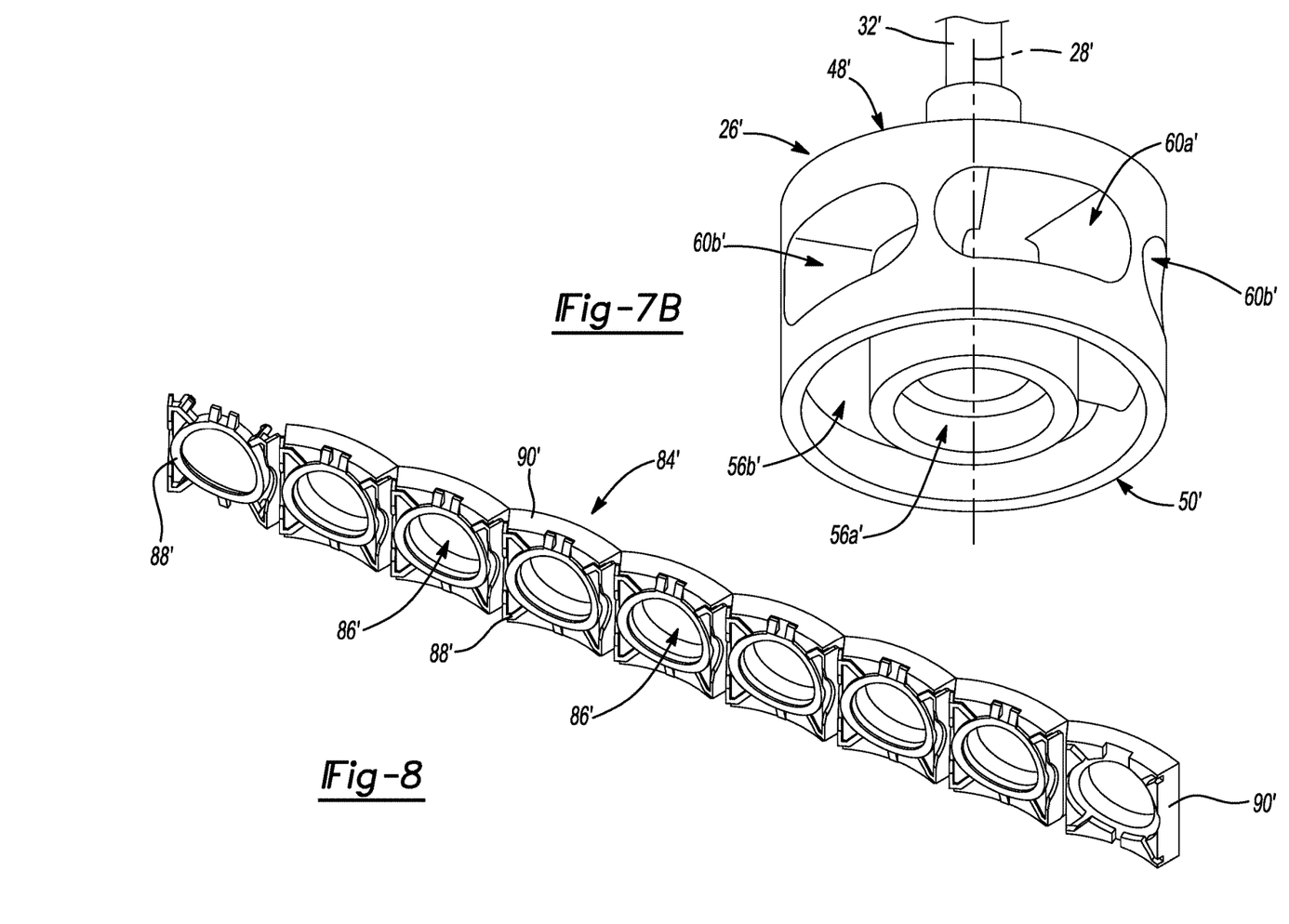
FIG. 7B is a bottom perspective view of the exemplary multi-port, rotary actuated valve assembly illustrated in FIG. 5 where the valve housing, valve discs, valve disc gaskets, and sealing elements have been removed to show the puck and shaft.
FIG. 8 is a side perspective view showing the sealing elements of the exemplary multi-port, rotary actuated valve assembly illustrated in FIG. 5 in a linear row, prior to being rolled up into a ring and installed in the valve housing.
Figure 9:
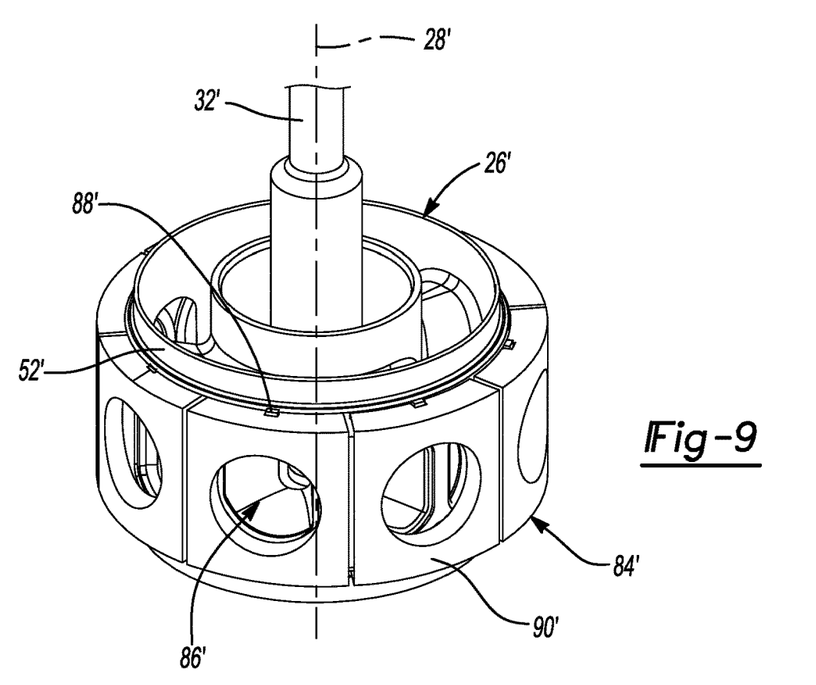
FIG. 9 is a top perspective view of the exemplary multi-port, rotary actuated valve assembly illustrated in FIG. 5 where the valve housing, valve discs, and valve disc gaskets have been removed to show the puck, shaft, and sealing elements.

As best seen in FIGS. 6, 8 and 9, the multi-port, rotary actuated valve assembly 20' includes a plurality of sealing elements 84' that are circumferentially arranged about the cylindrical face 52' of the puck 26'. The sealing elements 84' are therefore configured to provide a seal between the cylindrical face 52' of the puck 26' and the cylindrical wall 44' of the puck-receiving cavity 24' in the valve housing 22'. More particularly, the sealing elements 84' are fixably mounted inside the valve housing 22' such that the puck 26' is rotatable relative to the sealing elements 84' and each of the sealing elements 84' include a seal opening 86' that can be arranged in fluid communication with one or more of the circumferential chamber openings in the cylindrical face 52' of the puck 26' depending on the rotational position of the puck 26'. In addition, each seal opening 86' and/or groups of seal openings are aligned with and arranged in fluid communication with the third, fourth, fifth, and sixth ports 46c', 46d', 46e', 46f' in the valve housing 22'.

As shown in FIGS. 8 and 9, the plurality of sealing elements 84' are interconnected and form a chain of sealing elements 84'. In FIG. 8, the chain of sealing elements 84' is linear and flat and illustrates what the sealing elements 84' may look like after being formed by an injection molding process and before assembly. However, during assembly, the opposite ends of the chain of sealing elements 84' are brought together and connected to form an annular ring-shaped chain of sealing elements 84' that extend circumferentially about the cylindrical face 52' of the puck 26'. Although the number may vary, in the illustrated example there are a total of 8 sealing elements 84'. Preferably, each of the sealing elements 84' includes an abutment structure 88' made of a polymeric material and a support structure 90' that is made of a resilient material, such as rubber or an elastomer, for example. Preferably, the polymeric material forming the abutment structure 88' provides a low friction surface that abuts the cylindrical face 52' of the puck 26' and has a flex modulus that is less than or equal to 7,000 MPa. The support structure 90' supports the abutment structure 88' relative to the cylindrical wall 44' of the valve housing 22' while allowing the abutment structure 88' to move and flex radially to a limited degree. In other words, the support structure 90' acts as a cushion that biases the abutment structure 88' towards the cylindrical face 52' of the puck 26' and holds/presses the abutment structure 88' in contact with the cylindrical face 52' of the puck 26' to maintain good sealing.

Like with the multi-port, rotary actuated valve assembly 20 shown in FIGS. 1-4, the multi-port, rotary actuated valve assembly 20' shown in FIGS. 5-9 includes a distal valve disc 62' that is positioned in the distal region 42' of the puck-receiving cavity 24' between the puck 26' and the distal housing clamshell 36' and a proximal valve disc 64' that is positioned in the proximal region 40' of the puck-receiving cavity 24' between the puck 26' and the proximal housing clamshell 34'. The multi-port, rotary actuated valve assembly 20' also includes a distal valve disc gasket 72' and a proximal valve disc gasket 74'. The distal and proximal valve discs 62', 64' and the distal and proximal valve disc gaskets 72', 74' in FIGS. 5-9 are substantially similar to those shown and described in connection with FIGS. 1-4.

When the puck 26' is rotated during operation of the multi-port, rotary actuated valve assembly 20' to a rotational position where the distal first chamber opening 56a' and the circumferential first chamber opening(s) 60a' are arranged in fluid communication with corresponding ports 46a'-46h' in the valve housing 22', fluid may flow from the distal end 50' of the puck 26', through the first chamber 54a' of the puck 26', to the cylindrical face 52' of the puck 26' or from the cylindrical face 52' of the puck 26', through the first chamber 54a' of the puck 26', to the distal end 50' of the puck 26'. When the puck 26' is rotated to a rotational position where the distal second chamber opening 56b' and the circumferential second chamber opening(s) 60b' are arranged in fluid communication with corresponding ports 46a'-46h' in the valve housing 22', fluid may flow from the distal end 50' of the puck 26', through the second chamber 54b' of the puck 26', to the cylindrical face 52' of the puck 26' or from the cylindrical face 52' of the puck 26', through the second chamber 54b' of the puck 26', to the distal end 50' of the puck 26'.

As shown in FIGS. 6, 7A, and 7B, the distal first chamber opening 56a' and the distal second chamber opening 56b' are concentrically arranged on the distal end 50' of the puck 26' relative to the axis of rotation 28' such that the distal second chamber opening 56b' extends annularly about the distal first chamber opening 56a'. As a result, the distal first chamber opening 56a' and the distal second chamber opening 56b' provide at least two separate and parallel fluid flow paths at the distal end 50' of the puck 26' along which fluid may enter or exit the first and second chambers 54a', 54b' of the puck 26', respectively. In addition, the proximal third chamber opening 58c' and the proximal fourth chamber opening 58d' are concentrically arranged on the proximal end 48' of the puck 26' relative to the axis of rotation 28' such that the proximal fourth chamber opening 58d' extends annularly about the proximal third chamber opening 58c'. As a result, the proximal third chamber opening 58c' and the proximal fourth chamber opening 58d' provide at least two separate and parallel fluid flow paths at the proximal end 48' of the puck 26' along which fluid may enter or exit the third and fourth chambers 54c', 54d' of the puck 26', respectively.

Figure 10:
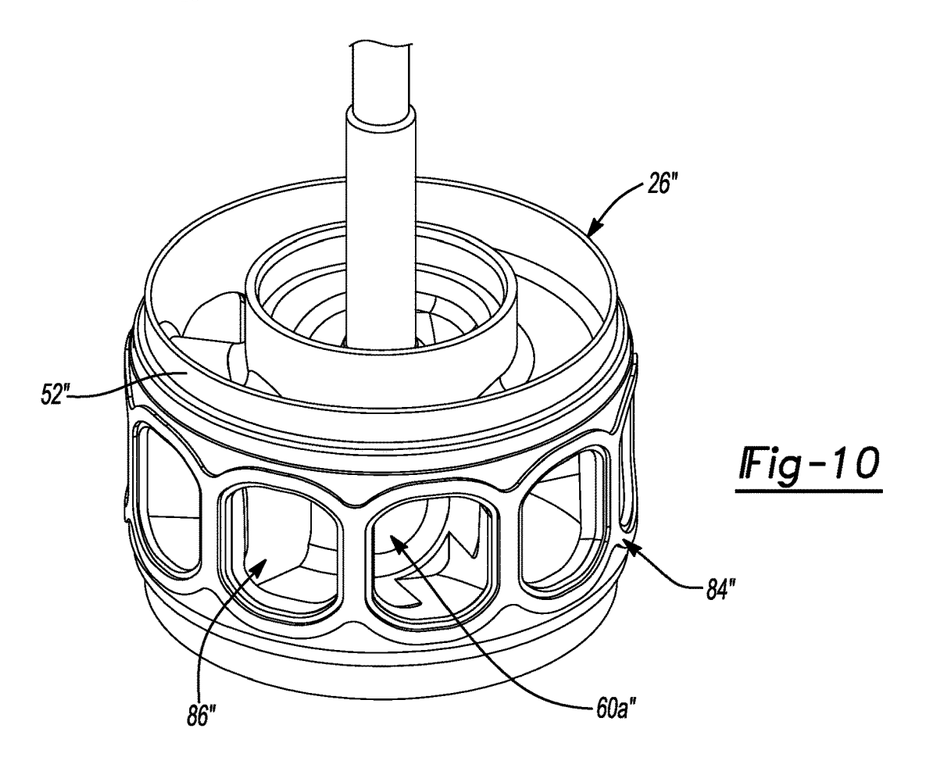
FIG. 10 is a top perspective view of another exemplary puck and shaft sub-assembly where sealing elements have been incorporated into the puck.

FIG. 10 illustrates another exemplary puck 26" of an alternative configuration, where the puck 26" includes a plurality of sealing elements 84" that are fixably mounted to the cylindrical face 52" of the puck 26" instead of to the cylindrical wall 44' of the valve housing 22' like in the configuration shown in FIGS. 5-9. As such, in accordance with the arrangement illustrated in FIG. 10, the plurality of sealing elements 84" rotate with the puck 26". Aside from that difference, many of the elements of the puck 26" shown in FIG. 10 are the same as the elements of the puck 26' shown in FIGS. 5-9 and therefore share the same reference numbers, except that a double prime (") annotation has been appended after the reference numbers in FIG. 10. As such, each of the sealing elements 84" illustrated in FIG. 10 also include a seal opening 86" that is arranged in fluid communication with at least one of the circumferential chamber openings 60a"-60d" in the cylindrical face 52" of the puck 26" and is configured to provide a seal between the cylindrical face 52" of the puck 26" and the cylindrical wall 44' of the puck-receiving cavity 24' in the valve housing 22'.

Like in the prior design, the plurality of sealing elements 84" are interconnected and form an annular ring-shaped chain of sealing elements 84" that extend circumferentially about the cylindrical face 52" of the puck 26". However, in this design, the sealing elements 84" are injection molded or overmolded from a softer material than the puck 26". By way of example and without limitation, the sealing elements 84" may be made of a thermo-plastic elastomer (TPE) or gas filled thermoplastic to reduce the flex modulus of the sealing elements 84", which allows the sealing elements 84" to maintain contact and a good seal with the cylindrical wall 44' of the puck-receiving cavity 24' notwithstanding tolerance variations between parts, thermal deformation, and/or wear. Alternatively, the seal elements 84" may be constructed with an abutment structure 88' made of a polymeric material and a support structure 90' that supports the abutment structure 88' and is made of a resilient material, as described above, except that in this configuration, the support structure 90' would support the abutment structure 88' relative to the cylindrical face 52" of the puck 26" while allowing the abutment structure 88' to move and flex radially to a limited degree and act as a cushion biasing the abutment structure 88' towards the cylindrical wall 44' of the valve housing 22' and holds/presses the abutment structure 88' in contact with the cylindrical wall 44' of the valve housing 22' to maintain good sealing.

Advantageously, the multi-port, rotary actuated valve assemblies 20, 20' described herein provide additional fluid routing capacity and valve positions for a given puck size, without requiring multiple valve bodies, multiple valve members, multiple actuators, or actuators with higher torque capacities. With respect to the later, the multi-port, rotary actuated valve assemblies 20, 20' described herein are designed to operate with low friction such that small, inexpensive electric actuators and gearsets can provide sufficient driving torque to rotate the puck 26, 26', 26" between the plurality of rotational positions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims. In addition, the steps of the method set forth herein may be practiced in a different order than that listed herein without departing from the scope of the appended claims.

What is claimed is:

1. A multi-port, rotary actuated valve assembly, comprising:
   a valve housing defining a puck-receiving cavity therein;
   a plurality of ports defined within said valve housing and arranged in fluid communication with said puck-receiving cavity;
   a puck positioned within said puck-receiving cavity and rotatable with respect to said valve housing about an axis of rotation between a plurality of rotational positions;
   said puck including a proximal end, a distal end opposite said proximal end, and a cylindrical face that is coaxially arranged with said axis of rotation;
   said puck including a plurality of chambers that are each fluidly isolated from one another inside said puck;

said plurality of chambers in said puck interconnecting different combinations of said plurality of ports in fluid communication depending on said rotational position of said puck;

said plurality of chambers in said puck including at least a first chamber with a distal first chamber opening on said distal end of said puck and a second chamber with a distal second chamber opening on said distal end of said puck;

said distal second chamber opening is radially spaced from said axis of rotation of said puck and said distal first chamber opening is positioned radially inboard of said distal second chamber opening relative to said axis of rotation;

said plurality of chambers in said puck further includes a third chamber with a proximal third chamber opening on said proximal end of said puck and a fourth chamber with a proximal fourth chamber opening on said proximal end of said puck, and the multi-port, rotary actuated valve assembly further comprises a distal valve disc positioned in said puck-receiving cavity in said valve housing that is arranged in abutting contact with said distal end of said puck and that includes a plurality of distal valve disc apertures that are each arranged in fluid communication with at least one of said distal first chamber opening and said distal second chamber opening when said puck is rotated to at least one of said rotational positions; and a proximal valve disc positioned in said puck-receiving cavity in said valve housing that is arranged in abutting contact with said proximal end of said puck and that includes a plurality of proximal valve disc apertures that are each arranged in fluid communication with at least one of said proximal third chamber opening and said proximal fourth chamber opening when said puck is rotated to at least one of said rotational positions.

2. The multi-port, rotary actuated valve assembly as set forth in claim 1, further comprising:

a distal valve disc gasket positioned in said puck-receiving cavity in said valve housing that is arranged in abutting contact between said distal valve disc and said valve housing to provide a fluid tight seal between said plurality of distal valve disc apertures and one or more of said ports in said valve housing; and a proximal valve disc gasket positioned in said puck-receiving cavity in said valve housing that is arranged in abutting contact between said proximal valve disc and said valve housing to provide a fluid tight seal between said plurality of proximal valve disc apertures and one or more of said ports in said valve housing.

3. The multi-port, rotary actuated valve assembly as set forth in claim 2, wherein said distal and proximal valve disc gaskets are each made of a resilient material and are axially taller than wide at one or more discrete cross-sections through said gaskets to bias said distal and proximal valve discs towards said distal and proximal ends of said puck, respectively, and permit a limited range of axial travel between said distal and proximal valve discs and said valve housing in an axial direction that is parallel to said axis of rotation.

4. The multi-port, rotary actuated valve assembly as set forth in claim 3, wherein said valve housing includes a proximal housing clamshell and a distal housing clamshell that are joined together by spot, sonic, or heat welding to form said puck-receiving cavity with said distal and proximal valve disc gaskets in a semi-compressed and pre-loaded condition at opposing ends of said puck.

5. The multi-port, rotary actuated valve assembly as set forth in claim 1, wherein said distal and proximal valve discs each have one or more anti-rotation features that prevent said distal and proximal valve discs from rotating relative to said valve housing.

6. The multi-port, rotary actuated valve assembly as set forth in claim 1, wherein said distal first chamber opening and said distal second chamber opening provide at least two separate and parallel fluid flow paths at said distal end of said puck along which fluid may enter or exit said first and second chambers of said puck, respectively.

7. The multi-port, rotary actuated valve assembly as set forth in claim 1, further comprising:

a shaft fixedly coupled to said puck that extends axially from said proximal end of said puck along said axis of rotation; and an electric actuator configured to drive rotation of said shaft to change said rotational position of said puck relative to said valve housing.

8. A multi-port, rotary actuated valve assembly, comprising:

a valve housing defining a puck-receiving cavity therein;

a plurality of ports defined within said valve housing and arranged in fluid communication with said puck-receiving cavity;

a puck positioned within said puck-receiving cavity and rotatable with respect to said valve housing about an axis of rotation between a plurality of rotational positions;

said puck including a proximal end, a distal end opposite said proximal end, and a cylindrical face that is co-axially arranged with said axis of rotation;

said puck having a plurality of chambers including at least a first chamber and a second chamber that are separated from one another within said puck;

said plurality of chambers in said puck interconnecting different combinations of said plurality of ports in fluid communication depending on said rotational position of said puck;

said first chamber extending between a distal first chamber opening on said distal end of said puck and a proximal first chamber opening on said proximal end of said puck;

said second chamber extending between a distal second chamber opening on said distal end of said puck and a proximal second chamber opening on said proximal end of said puck;

said second chamber including a circumferential second chamber opening on said cylindrical face of said puck; and said distal second chamber opening is radially spaced from said axis of rotation of said puck and said distal first chamber opening is positioned radially inboard of said distal second chamber opening relative to said axis of rotation.

9. The multi-port, rotary actuated valve assembly as set forth in claim 8, wherein said plurality of chambers in said puck further includes a third chamber extending between a distal third chamber opening on said distal end of said puck and a proximal third chamber opening on said proximal end of said puck and a fourth chamber extending between a distal fourth chamber opening on said distal end of said puck and a proximal fourth chamber opening on said proximal end of said puck.

10. The multi-port, rotary actuated valve assembly as set forth in claim 9, wherein said proximal first chamber opening, said proximal second chamber opening, said proximal third chamber opening, and said proximal fourth chamber opening are all radially offset from said axis of rotation at circumferentially spaced locations on said proximal end of said puck and wherein said distal second chamber opening, said distal third chamber opening, and said distal fourth chamber opening are all positioned radially outboard of said distal first chamber opening on said distal end of said puck relative to said axis of rotation.

11. A multi-port, rotary actuated valve assembly, comprising:
a valve housing defining a puck-receiving cavity therein;
a plurality of ports defined within said valve housing and arranged in fluid communication with said puck-receiving cavity;
a puck positioned within said puck-receiving cavity and rotatable with respect to said valve housing about an axis of rotation between a plurality of rotational positions;
said puck including a proximal end, a distal end opposite said proximal end, and a cylindrical face that is co-axially arranged with said axis of rotation;
said puck having a plurality of chambers including at least a first chamber and a second chamber that are separated from one another within said puck;
said plurality of chambers in said puck interconnecting different combinations of said plurality of ports in fluid communication depending on said rotational position of said puck;
said first chamber including a distal first chamber opening on said distal end of said puck and a circumferential first chamber opening on said cylindrical face of said puck;
said second chamber including a distal second chamber opening on said distal end of said puck and a circumferential second chamber opening on said cylindrical face of said puck; and
said distal first chamber opening and said distal second chamber opening are concentrically arranged on said distal end of said puck relative to said axis of rotation with said distal second chamber opening extending annularly about said distal first chamber opening.

12. The multi-port, rotary actuated valve assembly as set forth in claim 11, further comprising:
a plurality of sealing elements that are circumferentially arranged about said cylindrical face of said puck and configured to provide a seal between said cylindrical face of said puck and said puck-receiving cavity in said valve housing; and
each of said sealing elements including a seal opening that is arranged in fluid communication with one of said circumferential chamber openings in said cylindrical face of said puck.

13. The multi-port, rotary actuated valve assembly as set forth in claim 12, wherein said plurality of sealing elements are interconnected and form an annular ring-shaped chain of sealing elements that extend circumferentially about said cylindrical face of said puck and each of said sealing elements includes an abutment structure made of a polymeric material and a support structure that supports said abutment structure and is made of a resilient material.

14. The multi-port, rotary actuated valve assembly as set forth in claim 13, wherein said polymeric material forming said abutment structure has a flex modulus that is less than or equal to 7,000 MPa.

15. The multi-port, rotary actuated valve assembly as set forth in claim 12, wherein said plurality of sealing elements are fixably mounted inside said valve housing such that said puck is rotatable relative to said plurality of sealing elements.

16. The multi-port, rotary actuated valve assembly as set forth in claim 12, wherein said plurality of sealing elements are fixably mounted to said cylindrical face of said puck such that said plurality of sealing elements rotate with said puck within said puck-receiving cavity of said valve housing.

17. The multi-port, rotary actuated valve assembly as set forth in claim 12, wherein said proximal third chamber opening and said proximal fourth chamber opening are concentrically arranged on said proximal end of said puck relative to said axis of rotation with said proximal fourth chamber opening extending annularly about said proximal third chamber opening.

18. The multi-port, rotary actuated valve assembly as set forth in claim 11, wherein said plurality of chambers in said puck further includes a third chamber with a proximal third chamber opening on said proximal end of said puck and a circumferential third chamber opening on said cylindrical face of said puck and a fourth chamber with a proximal fourth chamber opening on said proximal end of said puck and a circumferential fourth chamber opening on said cylindrical face of said puck.

* * * * *